Nov. 17, 1931. W. A. GIBBONS ET AL 1,832,012
APPARATUS FOR FORMING RUBBER ARTICLES
Filed Oct. 28, 1927  3 Sheets-Sheet 3
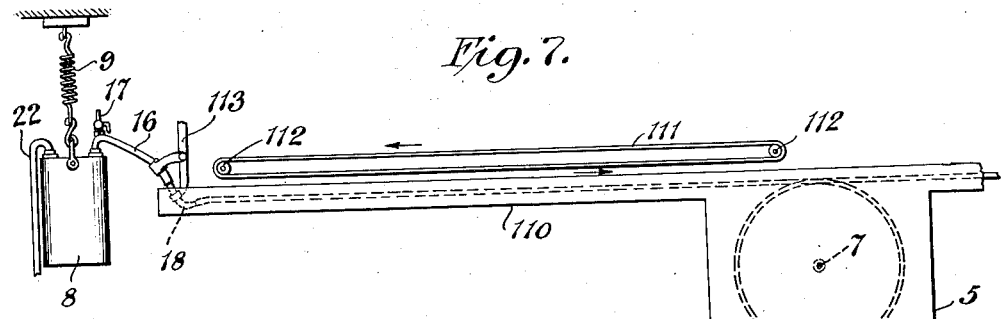
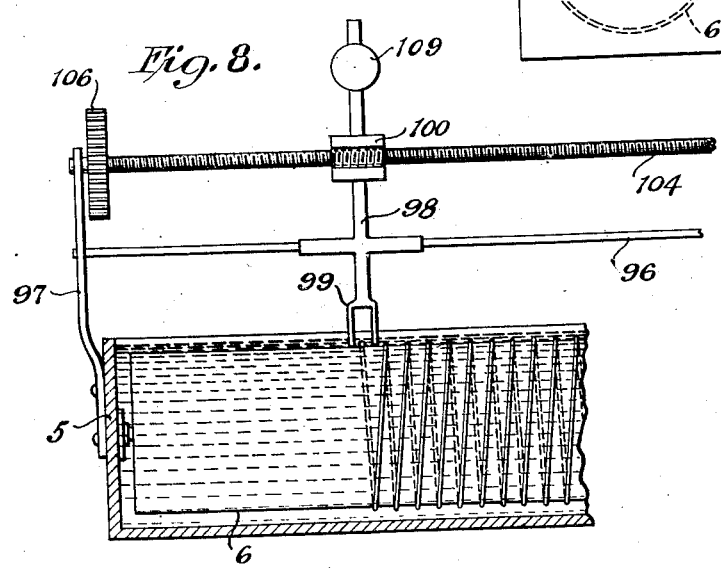
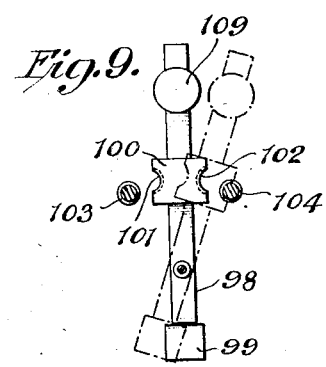
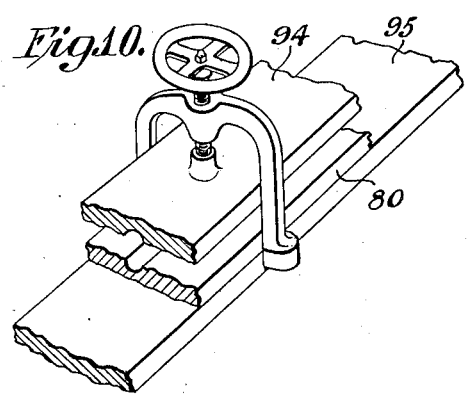
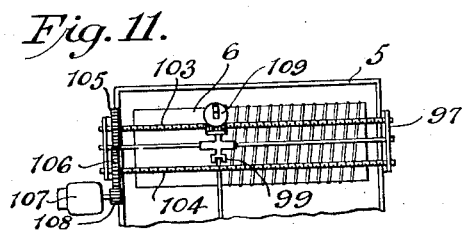
INVENTOR
Willis A. Gibbons
Eardley Hazell
By
Ernest H. Johnson
ATTORNEY Patented Nov. 17, 1931

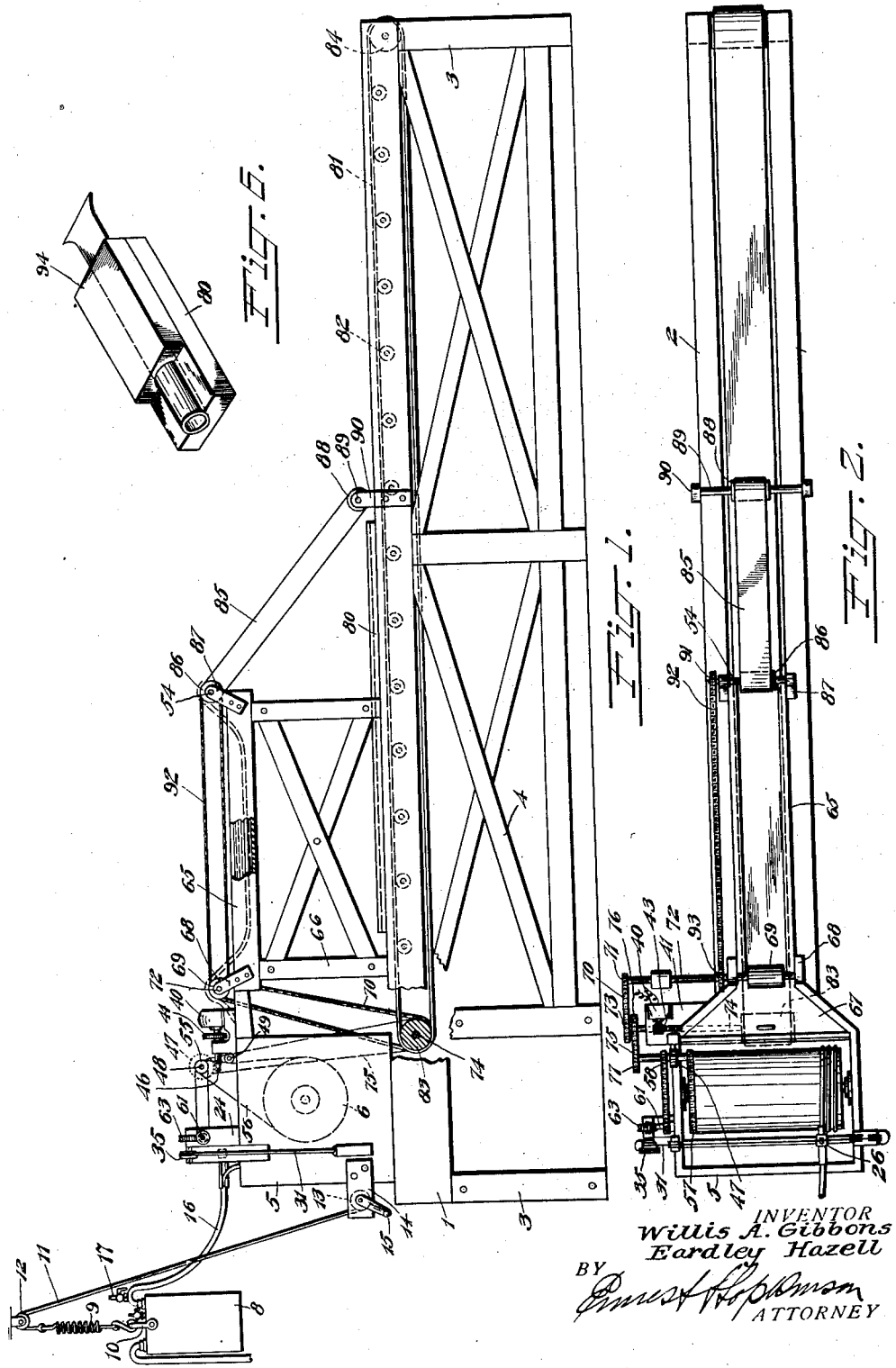

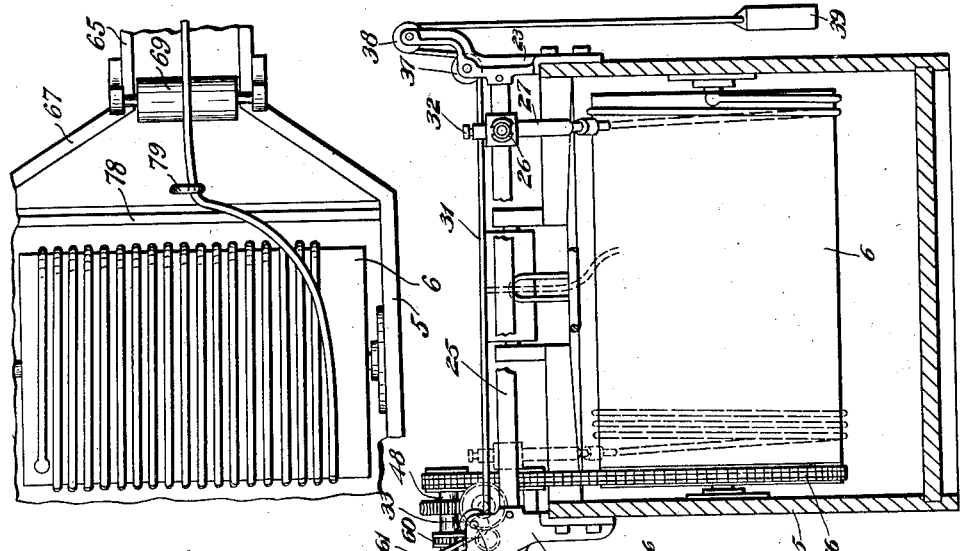
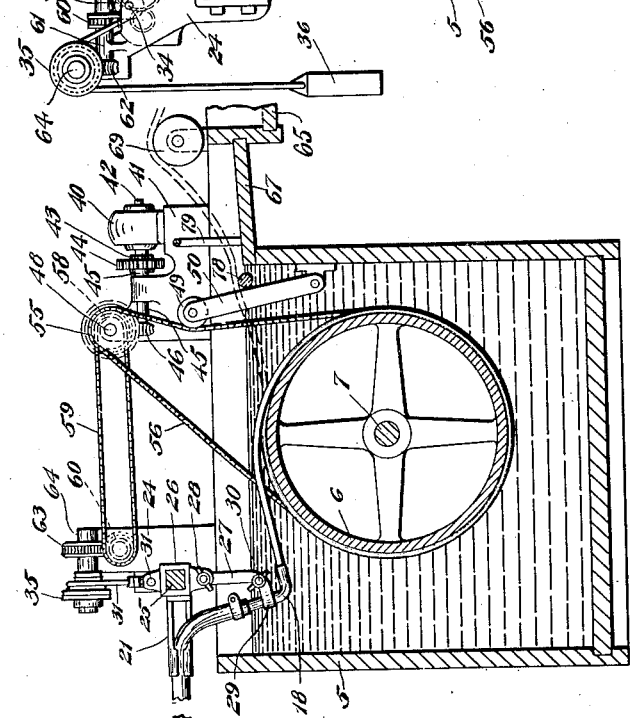

1,832,012

UNITED STATES PATENT OFFICE

WILLIS A. GIBBONS, OF GREAT NECK, AND EARDLEY HAZELL, OF NEW YORK, N. Y., ASSIGNORS TO GENERAL RUBBER COMPANY, OF NEW YORK, N. Y., A CORPORATION OF NEW JERSEY

APPARATUS FOR FORMING RUBBER ARTICLES

Application filed October 28, 1927. Serial No. 229,306.

This invention relates to an apparatus and method for the manufacture of tubing, thread or other articles by extruding a rubber dispersion into a coagulant.

In previously known apparatus for the formation of rubber tubing, thread, etc. by directly coagulating an aqueuos dispersion of rubber, the dispersion has been passed in a straight path through a body of coagulant while coagulating the same. The receptacle for the coagulant has necessarily been of considerable length and space consuming in order that the dispersion might be immersed in the coagulant a length of time sufficient to permit of the formation of coagulated rubber of the desired thickness. Variance in the force with which the dispersion issues into the coagulant also causes the diameter of the resulting tube to vary. Previously known devices for controlling the force have been relatively complicated and inaccurate.

It is an object of this invention to provide for the coagulation of a stream of rubber dispersion in a small amount of space. Another object is to provide a means for maintaining a uniform pressure upon the dispersion as it streams into the coagulant. Another object is to provide an improved method for forming tubing, thread, etc., directly from aqueous dispersions of rubber.

In carrying out these and other objects, latex or other dispersions of rubber which may or may not contain compounding ingredients and vulcanizing ingredients, is extruded at a predetermined rate of speed through a nozzle into a body of coagulant. When the stream of latex strikes the coagulant the surface thereof coagulates forming a latex filled tube which is then wound spirally upon a drum. Coagulation continues inwardly of the tube and when the walls of the tube have reached the desired thickness, the tube is unwound from the drum, the coagulant is washed therefrom, the core of uncoagulated dispersion is removed, and the tube is vulcanized. With a drum of sufficient size the time required to coagulate the desired wall thickness will be less than that required to cover the drum with tubing. In this case, when the desired wall thickness is attained, the leading end of the tube is removed from the drum and started through the rest of the apparatus while the streaming of the dispersion is continued until the drum has been completely covered.

A preferred form of apparatus by which the invention can be carried out, is shown in the accompanying drawings, in which:

Fig. 1 is a side elevation of the machine with parts broken away.

Fig. 2 is a plan view;

Fig. 3 is a fragmentary plan view on an enlarged scale illustrating more clearly how the coagulated tube is unwound from the drum;

Fig. 4 is an enlarged vertical longitudinal sectional view through the coagulating tank and also showing more clearly the latex supply tank;

Fig. 5 is a vertical transverse sectional view through the coagulating tank;

Fig. 6 is a detail broken away perspective view showing the tubing confined externally incident to the removal of latex from the center thereof;

Fig. 7 is a broken side view of a modified form of the apparatus showing a preliminary coagulating tank communicating with the main coagulating tank;

Fig. 8 is a front sectional view of an alternative device for feeding the tube of coagulated rubber dispersion transversely across the main coagulating tank;

Fig. 9 is a sectional view through the guide rod and driving screws showing the relation of the rocker arm thereto;

Fig. 10 is a perspective view of a portion of an elongated press which is to receive the mold section; and Fig. 11 is a plan view showing the alternative device for laterally moving the tube of partially coagulated rubber composition.

Referring particularly to the drawings, the apparatus comprises a table formed of the angle bars 1 and 2 which are carried by supports 3, the supports being braced by rods 4. Receptacle 5 is rigidly affixed to the table at one end thereof and is adapted to contain coagulant for the rubber dispersion. A drum 6 of wood or other suitable material is disposed within the receptacle, being rotatably carried upon a shaft 7 which is secured to the side walls of the receptacle. The drum is submerged beneath the surface of the coagulant, which can be aqueous acetic acid or any other suitable coagulant such as a mixture of alcohol and acetic acid. The coagulant is made of approximately equal specific gravity to that of the rubber dispersion to be described later.

A rubber dispersion is streamed into the coagulant from a reservoir 8 which is suspended adjacent the coagulant receptacle by a spring 9 which is attached at one end to hooks 10 carried by the reservoir and is secured at the other end to a cord 11. The cord passes over a pulley wheel 12 which is secured to the ceiling of the room or to any suitable support and at its other end is wound around a windlass 13 which is carried by brackets 14 extending rigidly from the receptacle 5. A handle 15 attached to the windlass enables winding and unwinding of the same. The rubber dispersion is conducted from the reservoir 8 into the receptacle 5 by means of a siphon 16, one end of which extends into the reservoir 8 terminating near its base and the other end of which passes out through the top of the reservoir and extends into the coagulant in the receptacle 5. The delivery end of the siphon is made of flexible tubing and a nozzle 18 made of glass or other suitable material is connected thereto and opens into the coagulant. A cap which may be in the form of a rubber stopper or otherwise is provided to close the opening of the nozzle. The nozzle is preferably of approximately the same internal diameter as the external diameter of the tube or thread to be formed. A petcock 17 is provided at the top of the siphon 16 through which suction can be applied for filling the siphon without permitting retention of air bubbles in the bend of the siphon. A tube 22 opens into the top of the reservoir 8 and is adapted to be used for introducing the rubber dispersion into the reservoir. It is also designed to admit air either under atmospheric pressure or under higher or lower pressure as may be desired in conducting the rubber dispersion from the reservoir. A petcock provided in the top of the reservoir is adapted to be connected to a source of suction which is actuated to withdraw any bubbles of air which may be entrapped in the dispersion before the tube forming operation is begun. The reservoir is raised or lowered as desired by the windlass 13, whereby the proper hydraulic head is obtained upon the rubber dispersion. The spring 9 functions so that as the reservoir is emptied of its contents, the reservoir will be raised sufficiently to maintain the hydraulic head constant throughout the operation of streaming rubber dispersion into the coagulant.

Provision (not shown) can be made for agitating the rubber dispersion in the reservoir to prevent settling of the same.

The dispersion of rubber with which the reservoir 8 is filled can be latex or an artificial dispersion of rubber either of which can contain vulcanizing and compounding ingredients. In preparing the dispersion, care is exercised that it be free from bubbles of air and from lumps of material. A suitable composition for use in the apparatus is as follows:

| | Parts by weight |
|---|---|
| Rubber (as 60% latex) | 100 |
| Sulphur (precipitated) | 2.7 |
| Heptaldehyde aniline condensation product | .5 |
| Zinc oxide | 2 |
| Glue | .2 |

The viscosity of the material can be varied as may be deemed expedient for the size of tubing to be formed. A concentration of 55% has been found satisfactory. Other vulcanizing and compounding ingredients can be used depending upon the time and temperature of the cure and the characteristics which are desired in the completed tubing.

Apparatus is provided for conducting the nozzle 18 laterally through the tank as the dispersion is streamed therefrom. Brackets 23 and 24 (Figs. 4 and 5) extend upwardly from the receptacle 5 and carry between them a bar 25 which extends across the open top of the receptacle 5. A bracket 26 is slidably carried upon this bar and is provided with an arm 27 which is pivoted to the bracket and extends downwardly into the tank 5. A wing nut 28 provides for adjustment of the arm 27. A clamp 29 is pivoted upon the arm 27 and carries the nozzle 18 which extends between the arms of the clamp. Arms 21 carried by the bracket 26 serve to support the tube 16 and prevent sharp bends in the same. Adjustment of the wing nut 30 permits either sliding or pivotal adjustment of the nozzle 18. A cord or band 31 of flexible material passes through an extension of the bracket 26 and is attached thereto by means of a set screw 32. The cord is adapted to pass under a pulley 33 which is rotatably carried upon a pin 34 which pin is secured in the bracket 24 at one side of the receptacle 5. From the pulley 33, the cord passes over one of the grooves of a cone pulley 35 which is positioned on the bracket and a weight 36 is suspended from the free end of the cord. The opposite end of the cord 31 passes under a pulley 37 and over a pulley 38 which are mounted in the bracket 23, and its free end carries a weight 39. The weights provide sufficient frictional contact between the pulley 35 and the cord to cause the cord to draw the bracket 26 along the bar 25 as the pulley is driven in a manner to be later described.

Rotation of the drum 6 is effected by means of a motor 40 which is supported upon a bracket 41 which protrudes from the side of the receptacle 5. The drive shaft 42 of the motor carries rigidly secured thereto a gear 43. This gear meshes with a corresponding gear 44 which is rigidly mounted upon a shaft 45, the shaft being rotatably carried in a boss which extends from the bracket 41. A gear 46 is secured upon one end of the shaft 45 and engages with a gear 47 which is rigidly affixed to a shaft 48, shaft 48 being rotatably mounted in a boss carried by the bracket 41. A sprocket 55 is rigidly mounted upon the shaft 48 and drives a chain 56 which passes around a sprocket 57 carried by the drum 6. An arm 50 is pivotally mounted upon the inner wall of the receptacle 5 and carries rotatably at its extremity a roll 49. This roll is designed to bear against the chain 56 and take up the slack in the chain.

During rotation of the drum 6, the nozzle 18 is drawn laterally across the face thereof. Driving power is transmitted from the shaft 48 as follows: A sprocket 58 is rigidly attached to the shaft 48 and carries a chain 59 which passes around a sprocket 60 carried rigidly upon the shaft 61 which latter is rotatably mounted in the bracket 24. Shaft 61 carries rigidly a gear 62 which is adapted to mesh with a gear 63. Gear 63 is rigidly affixed to a shaft 64 which is rotatably mounted in the bracket 24, and the pulley 35 over which the cord 31 passes is carried by the shaft 64.

By the mechanism described, the drum 6 is rotated in a clockwise direction, as viewed in Fig. 4, and the nozzle 18 is carried across the tank at a rate of speed such that the rubber tube formed from the dispersion is wound upon the drum in a continuous length of helical form with the turns thereof in spaced relation. Coagulation continues inwardly of the tube while the dispersion remains immersed in the coagulant. When a sufficient length of time has elapsed to permit the formation of a tube having the desired wall thickness, the tube is conducted from the coagulant into and through a wash tank 65. The wash tank is positioned adjacent the receptacle 5, being mounted upon the supports 66 which in turn rest upon the angle bars 1 and 2. The adjacent wall of the receptacle 5 is cut away at its outer portion a slight amount and a table 67 rests thereon and extends to and is supported by the end wall of the wash tank 65. Brackets 68 mounted on opposite sides of the wash tank serve as supports for a roll 69 mounted therebetween. The roll is adapted to be driven by a chain 70 which passes around the sprocket 71 rigidly attached to the shaft 72 upon which the roll is mounted. The chain 70 passes around a sprocket 73 which is carried by a shaft 74, the shaft being rotatably supported by the angle bars 1 and 2. The shaft is driven by a chain 75 which passes around a sprocket 76 on shaft 74 and around a sprocket 77 upon the shaft 48.

A guide rod 78 made of glass or other suitable material is suitably positioned so as to serve as a support for the length of tubing as it is conducted from the receptacle 5. An additional guide means 79 of inverted U-shape made of glass or other suitable material is secured to the table 67 and it is designed that the length of rubber tubing shall be passed between the arms of the member 79 over the roll 69 and into the wash tank 65. The wash tank 65 contains water or water and ammonia, into which the tubing can be submerged and the coagulant washed therefrom.

After the length of rubber tubing has been washed to remove coagulant from the same, it is removed from the wash tank to a container in which it can be suitably held while the core of uncoagulated rubber dispersion is being removed. A suitable container is comprised of the mold sections 80 and 94. The mold section 80 is carried upon a belt conveyor 81, the upper length of which is supported upon a plurality of rolls 82 which are carried by the angle bars 1 and 2. The conveyor passes over a driving roll 83 which is rigidly mounted upon the shaft 74. The opposite end of the conveyor passes around the roll 84. The rate of travel of the conveyor is so timed that the mold section 80 will be passed along at the same rate at which the length of rubber tubing is delivered thereto. The tubing is conducted to the mold by means of a belt conveyor 85 which passes around a drive roll 86 which is rotatably mounted on shaft 54 between a pair of supporting brackets 87, the latter being secured to the wash tank 65. The opposite end of the conveyor 85 is supported by a roll 88 which is rigidly mounted upon a shaft 89 carried by brackets 90 which are fastened to the angle bars 1 and 2. The shaft 54 carries a sprocket 91 rigidly affixed thereto which is designed to be driven by a chain 92 which passes around the same and around a sprocket 93 rigidly secured to the shaft 72. Sufficient space is left between the roll 88 and the belt 81 so that the mold section can be passed therebetween. Upon positioning of the length of the rubber tubing in the mold section 80, the corresponding mold section 94 is applied thereto. The mold can be a multiple cavity type. Receptacles other than an elongated mold are contemplated for use in receiving the tube at this stage of the operation such for example as a vessel containing spiral grooves which vessel can be revolubly mounted. The tubing can be caught in a trough if desired and the use of a mold dispensed with.

In utilizing the apparatus described, the rubber dispersion is placed in the receptacle 8. The siphon is first washed with water in order to wet and thereby prevent formation of air bubbles along the walls as the dispersion is drawn into the siphon. The cap is placed firmly upon the nozzle of the siphon and suction is applied to the petcock 17 drawing the rubber dispersion into the siphon. After filling the siphon a small quantity of the dispersion is drawn over through the petcock and may be caught in a trap in the suction line. This method of filling the siphon insures that no bubbles of air will be trapped therein. The reservoir 8 is hoisted by the windlass to a position such that the level of the rubber dispersion is well above the top of the coagulating tank. The hydraulic head of the latex is adjusted by raising or lowering the reservoir until the tubing coagulated from the stream of dispersion issuing from the nozzle has the desired diameter. The nozzle is adjusted so that it extends approximately parallel to the surface of the coagulant and is immersed in the liquid so that the orifice is covered with a layer of acid mixture. The extent to which the nozzle is tilted depends upon the specific gravity of the dispersion and the coagulant. The specific gravities are made approximately equal so that the latex will stream directly forward from the nozzle without being carried sharply upwardly or bending sharply downwardly upon the drum. This protects the tubing from having sharp folds formed in its sidewalls.

The motor is started thereby causing rotation of the drum 6 and operation of the other parts of the machinery. The bracket 26 is brought to a position above one side of the coagulating tank 5 and the stop is removed from the nozzle 18 and drawn to the top of the drum 6, thus leading the stream of latex while coagulating to the edge of the rotating drum. The coagulated end of the stream is pressed firmly against the drum adhering thereto, and as the drum rotates, it winds the tubing about itself. Meanwhile, the nozzle is carried longitudinally across the tank thereby causing the length of tubing to settle upon the drum in the form of a helical coil. When the available space upon the drum has been covered with tubing, the cap is replaced upon the nozzle. The time at which the dispersion first began to stream into the coagulant having been noted the resulting tubing is maintained in the coagulant until sufficient time has elapsed for the tube to have gained the desired wall thickness by action of the coagulant. Thereupon the first formed end of the tube is pulled away from the drum, passed over the glass rod 78 between the arms of the U-shape member 79 and over the roll 69 into and through the wash tank 65 and is placed upon the belt conveyor 85. The operation of removing the remainder of the length of tubing from the drum and through the wash tank continues automatically as the drum revolves. The belt conveyor 85 delivers the tube into the groove of an elongated mold section 80 which is carried by the belt conveyor 81 past the delivery point of the conveyor 85 at the same speed as the tubing is fed to it. The tubing is severed into lengths slightly longer than the length of the mold and the walls of the ends are pressed together. This occurs usually as a result of the severing action.

The tubing formed in this way contains a core of uncoagulated rubber dispersion which can be removed as follows: The mold section 80 is carried by the belt conveyor into an elongated press 95. This press is shown in Fig. 10 as a hand press. A hydraulic or other type of press can be substituted therefor. The complementary mold section 94 may be carried by the upper beam of the press and, when the press is closed, section 94 rests upon the mold section 80 and is so held during the washing operation. Incisions are then made in the projecting ends of the tube, and a stream of water is forced through the length of tubing, driving out the dispersion contained therein, which treatment may be followed by injecting a current of air through the tubing thereby blowing out the residual water. The exit end of the tube is then sealed by pressing the walls together and air is forced through until the sealed end bursts. This procedure causes the tube to swell and fill the mold uniformly, thereby removing any defects which may have been incurred through handling. In case of large size tubing where loss of rubber dispersion would be considerable, the latter is recovered by first displacing it with air, collecting it separately, and then washing out the residue in the tube by a stream of water. If a solid thread is made, these steps are not necessary. The tube may then be vulcanized in water. Vulcanization with the particular composition described can be effected by heating for thirty-five minutes at twenty-seven and one-half pounds saturated steam pressure. The vulcanized tube can then be dried in any suitable manner. Any other suitable method of vulcanization may be used or the tube may be formed from a vulcanized rubber dispersion.

In Figs. 8, 9 and 11 of the drawings there is illustrated a modification of the means for conducting the tube of partially coagulated rubber dispersion, formed in the preliminary coagulating tank, 110 shown in Fig. 7, longitudinally across the tank 5. This modification is adaptable also for similarly conducting the nozzle 18. It comprises a guide rod 96 rigidly supported by brackets 97 above the receptacle 5 in spaced relation thereto. A rocker arm 98 is carried by the guide rod 96 for slidable movement thereon. The lower end of the rocker arm is forked at 99 to act as a guide for the partially coagulated rubber dispersion. A collar 100 is carried upon the rocker arm in spaced relation to the guide rod 96 and is provided on opposite sides thereof with threaded grooved portions 101 and 102. These grooved portions are adapted to alternately engage two screw rods 103 and 104 which extend longitudinally across the receptacle 5 in spaced relation thereto and are mounted for rotary movement in the brackets 97. The rods 103 and 104 carry gears 105 and 106 respectively which interengage, and gear 106 is driven by the motor 107 through the pinion 108. The rods are positioned upon opposite sides of the rocker arm 98 so that upon inclination of the rocker arm to one side, it will engage the threads of one of the rods and be driven longitudinally across the receptacle 5 in one direction. Upon inclination of the rocker arm 98 in the opposite direction, it bears against and is driven by the other rod in the reverse direction across the receptacle 5 to a position ready to conduct a fresh tube laterally across the receptacle. The upper end of the rocker arm 98 carries a weight 109 to insure positive engagement of the rocker arm with the screw rods. The speed of rotation of the rods 103 and 104 is such that the rocker arm 98 is moved laterally across the receptacle 5 at a rate of speed to cause the tube of partially coagulated rubber composition to be wound upon the periphery of the drum in spaced spirals. This feed is positive in its action and causes a smooth continuous lateral feed of the rocker arm.

In the modification of the device illustrated in Fig. 7, there is provided an elongated preliminary coagulating tank 110 which is connected with the upper portion of the main coagulating tank 5 and is adapted to contain coagulant at the level of the coagulant in the tank 5. An endless string or conveyor 111 is positioned above the preliminary coagulating tank extending substantially the length thereof. It is carried upon supporting and driving rolls 112 which are connected with the source of power in any suitable way so as to drive the conveyor at substantially the rate of speed that the periphery of the drum 6 revolves. Rubber dispersion is conducted into the coagulant at the end of the preliminary coagulating tank 110 through the nozzle 18 which is supported by a bracket 113. As it issues from the nozzle 18, the outer portion of the rubber dispersion coagulates and can be manually pressed against the conveyor 111 and adheres thereto. The conveyor conducts the end of the tube of partially coagulated dispersion through the tank 110 to a position adjacent the drum 6, whereupon the end of the tube is removed from the conveyor 111 and is pressed against and adheres to the drum 6 which immediately proceeds to wind the tube about its periphery. The preliminary coagulating tank 110 is made sufficiently wide where it connects with the tank 5 so that the tube of partially coagulated dispersion can be drawn to either end of the drum. An advantage of the preliminary coagulating tank is that the partially formed tube can be maintained in a still body of coagulant until it has become considerably hardened, so that upon its arrival at the rotatable drum 6, the walls of the partially coagulated tube are sufficiently thick to prevent injury to the same while being coiled upon the periphery of the drum.

When large size tubing is to be made, such as for example tubing having a diameter of one half inch or more, it is necessary that the partially formed tube be maintained in a still body of coagulant for a prolonged period of time in order that side walls may be formed of a sufficient thickness to permit of disposing the tube in a coil upon the surface of the drum 6 without injury to the partially formed tube. This result is preferably attained by the following arrangement of parts. The preliminary coagulating tank is formed of considerable width and is divided into a plurality of channels by means of partitions extending longitudinally thereof. The partitions are made of glass or other suitable material to which the rubber tubing will not readily adhere. An endless string corresponding to the conveyor 111 is disposed over each channel and is driven in travel in the manner described in connection with conveyor 111. A nozzle, such as 18, is disposed in the outside channel which opens upon one end of the drum 6. Rubber dispersion is permitted to issue from the nozzle 18 into the coagulant contained in the channel. As the dispersion coagulates, the end thereof is manually pressed against the endless string adhering thereto and is conducted through the channel at a rate of speed sufficient to maintain the tubing straight while it is being formed. When the end of the tubing is brought to the end of the channel adjoining the drum 6, it is removed from the string and is pressed against either the side walls of the channel or a support disposed within the channel, and adheres thereto. At the same time, the flow of rubber dispersion from the nozzle 18 is discontinued and the rear end of the partially formed tube is disconnected therefrom and is caused to adhere to either the side walls of the channel or to a support disposed within the channel. Rubber dispersion is now caused to stream from the nozzle 18 into the next adjoining channel and a tube of partially coagulated rubber composition is formed in this channel in exactly the same manner as was just described. This operation can be repeated until each of the channels contains a tube of rubber composition. Coagulation is allowed to proceed in the first formed tube until it has side walls of sufficient strength so that the tube can be wound upon the drum 6 without bursting or collapsing. When this has been accomplished the ends of the tube are loosened from their supports and the forward end is pressed against and caused to adhere to the drum 6. The tube is now wound around the drum 6 in the manner previously described. The operation is preferably so coordinated that at the time that the rear end of the tube passes from the channel, the next adjoining tube has reached the desired degree of strength. The forward end of the last mentioned tube is then preferably secured to the rear end of the first formed tube by pressing them together and in this way a continuous length of tubing is drawn around the drum 6 from the channels. As the chanels are emptied of their contents, additional rubber dispersion is streamed thereinto and the process of forming tubing is repeated. The coagulated tubing is removed from the drum 6 in the manner previously described.

While in the apparatus described, a single drum has been used, it is contemplated to mount two or more drums adjacent each other and to remove the tube from one drum while a new tube is being formed on the other drum. Other driving means, such as a chain or belt, can be substituted for the cord 31. It is also contemplated to provide the surface of the drum with a spiral groove into which the tube will be seated as it is formed. Other modifications will suggest themselves to those skilled in the art.

Having thus described our invention, what we claim and desire to protect by Letters Patent is:

1. An extruding machine comprising a receptacle adapted to contain coagulant for a rubber dispersion, means for streaming a rubber dispersion into the coagulant below the surface of the latter, means whereby the depth and direction of the stream may be varied, a rotary member for winding the material in a coil as it coagulates, and means for removing the coagulated stream.

2. An extruding machine comprising a receptacle adapted to contain coagulant for a rubber dispersion, means for streaming a rubber dispersion into the coagulant, a drum for winding said stream as it coagulates, means for washing the coagulated material, and means moving in unison with said drum for removing the coagulated material from the coagulant receptacle to said washing means.

3. An extruding machine comprising a receptacle adapted to contain coagulant, a vessel adapted to contain rubber dispersion, feeding means for passing the dispersion from the vessel into the coagulant, and means for relatively moving the vessel and the outlet of the feeding means whereby the head of the body of dispersion is maintained constant.

4. An extruding machine comprising a receptacle adapted to contain coagulant, a vessel adapted to contain rubber dispersion, feeding means for passing the dispersion from the vessel into the coagulant, and means for elevating the vessel as the dispersion issues therefrom whereby the head of the body of dispersion is maintained constant.

5. An extruding machine comprising a receptacle adapted to contain coagulant, a vessel adapted to contain rubber dispersion, feeding means for passing the dispersion from the vessel into the coagulant, and spring means for elevating the vessel as the dispersion issues therefrom whereby the head of the body of dispersion is maintained constant.

6. An extruding machine comprising a receptacle adapted to contain coagulant, a vessel adapted to contain rubber dispersion, feeding means for passing the dispersion from the vessel into the coagulant, means for relatively moving the vessel and the outlet of the feeding means whereby the head of the body of dispersion is maintained constant, means for coiling the coagulated dispersion, and means for relatively moving said outlet and coiling means.

Signed at New York, New York, this 21st day of October, 1927.

WILLIS A. GIBBONS.

Signed at New York, New York, this 21st day of October, 1927.

EARDLEY HAZELL.